US012644472B2

(12) United States Patent
Giglio

(10) Patent No.: US 12,644,472 B2
(45) Date of Patent: Jun. 2, 2026

(54) MODULAR FAN ARRAY

(71) Applicant: Coil Master Corporation, Moscow, TN (US)

(72) Inventor: Marco Giglio, Blainville (CA)

(73) Assignee: Coil Master Corporation, Moscow, TN (US)

( * ) Notice: Subject to any disclaimer, the term of this patent is extended or adjusted under 35 U.S.C. 154(b) by 0 days.

(21) Appl. No.: 17/970,910

(22) Filed: Oct. 21, 2022

(65) Prior Publication Data

US 2024/0133399 A1 Apr. 25, 2024
US 2024/0229826 A9 Jul. 11, 2024

(51) Int. Cl.

*F04D 29/60* (2006.01)
*F04D 25/12* (2006.01)
*F04D 25/16* (2006.01)
*F04D 29/40* (2006.01)
*F04D 29/64* (2006.01)

(Continued)

(52) U.S. Cl.

CPC ......... *F04D 29/602* (2013.01); *F04D 25/166* (2013.01); *F04D 29/403* (2013.01); *F04D 29/603* (2013.01); *F04D 29/646* (2013.01); *F04D 25/12* (2013.01); *F04D 29/664* (2013.01); *F05D 2260/31* (2013.01); *F24F 1/38* (2013.01);

(Continued)

(58) Field of Classification Search

CPC ........ F04D 25/166; F04D 25/12; F04D 25/14; F04D 29/601; F04D 29/602; F04D 29/603; F04D 29/646; F04D 29/663; F04D 29/664; F04D 25/08; F24F 2221/36; F24F 2013/205; F24F 1/38

See application file for complete search history.

(56) References Cited

U.S. PATENT DOCUMENTS 2,710,717 A * 6/1955 Palmer .................. F04D 29/646 261/30
2,911,900 A * 11/1959 Emil ....................... F24F 7/025 454/352
2023/0031104 A1* 2/2023 Diehl .................... F04D 29/601

FOREIGN PATENT DOCUMENTS

CN 108691794 A * 10/2018
WO WO-01/51858 A1 * 7/2001

(Continued)

OTHER PUBLICATIONS

English machine translation of WO 01/51858-A1, Nov. 2, 2023.*

(Continued)

*Primary Examiner* — Christopher Verdier
(74) *Attorney, Agent, or Firm* — Arnold & Porter Kaye Scholer LLP

(57) ABSTRACT

A modular fan array includes a fan assembly having a fan wheel, a fan motor, and a mounting bracket. The fan wheel has a diameter. The assembly includes a frame having at least a pair of vertical members having a spacing therebetween. The spacing is greater than the fan wheel diameter. The mounting bracket includes a motor mount portion and a pair of rearwardly and outwardly extending legs. The motor mount portion includes an opening in which the motor is mounted. The rearwardly and outwardly extending legs each have a first angled section angled relative to the motor mount portion and second frame mount portion. The frame mount portions extend outwardly from the angled portions and parallel to the motor mount portion. The frame mount portions are removably secured to the frame.

13 Claims, 2 Drawing Sheets

(51) Int. Cl.
*F04D 29/66* (2006.01)
*F24F 1/38* (2011.01)
*F24F 13/20* (2006.01)

(52) U.S. Cl.
CPC ..... *F24F 2013/205* (2013.01); *F24F 2221/36* (2013.01)

(56) References Cited

FOREIGN PATENT DOCUMENTS

| | | | | |
|---|---|---|---|---|
| WO | WO-2019/159282 | A1 | * | 8/2019 |
| WO | WO-2019/211895 | A1 | * | 11/2019 |

OTHER PUBLICATIONS

English machine translation of WO-2019/211895-A1, Nov. 2, 2023.*
English machine translation of CN-108691794-A, Nov. 2, 2023.*
English machine translation of WO-2019/159282-A1, Mar. 3, 2025.*

* cited by examiner

MODULAR FAN ARRAY

BACKGROUND

This disclosure relates generally to air-handling systems. More specifically, this disclosure relates to a modular fan array system.

Air-handling systems are utilized to move air according to desired ventilation parameters for the environment of the system. The air-handling systems can be designed to provide desired volumetric flow rates and desired pressures for a specific environment. Air handling systems are used in almost every commercial and industrial facility. Air handling systems include components configured to work together to condition air as part of a primary ventilation system for facilities.

Air-handling systems can utilize one or more fan arrays formed from multiple individual fans to move the air instead of a single fan structure. The individual fans form a fan array and work in parallel to generate the required output from that fan array.

Air handling loads, e.g., heating and cooling loads, as well as circulation requirements generally, vary based on the type, size and location of a facility, occupation, use and the like. As such, air handling systems are custom designed for each individual facility.

Fan assemblies, which include the fan, motor, shrouds and any supports required for installation are installed within large metal (e.g., steel) grid structures. These assemblies are large and heavy, and may require that a building structure is redesigned or reinforced to meet building codes in the event of retrofit design. These assemblies also require large footprints, possibly reducing the space available for other equipment/operations within the facility.

Accordingly, there is a need for a lighter weight, smaller footprint fan array. Desirably, such a fan array permits less assembly time and material. More desirably, such a fan array is flexible in design allowing for any arrangement of the array, and permits easy fan motor and fan wheel replacement.

SUMMARY

According to an aspect of the disclosure, a modular fan array includes a fan assembly having a fan wheel, a fan motor, and a mounting bracket. The fan wheel has a diameter. The assembly further includes a frame having at least a pair of vertical members having a spacing therebetween. The spacing is greater than the fan wheel diameter.

The mounting bracket includes a motor mount portion and a pair of rearwardly and outwardly extending legs. The motor mount portion includes an opening in which the motor is mounted. The rearwardly and outwardly extending legs each have a first angled section angled relative to the motor mount portion and second frame mount portion. The frame mount portions extend outwardly from the angled portions and parallel to the motor mount portion. The frame mount portions are removably secured to the frame.

In an embodiment, the mounting bracket is formed as an integral part of the fan assembly. The mounting bracket can be secured to the frame by, for example, bolts.

In an embodiment, the modular fan assembly further includes a housing, with the fan assembly and frame mounted within the housing. The housing includes a front panel. A fan inlet plate can be mounted to the front panel. The fan inlet plate is associated with and defines an opening for the fan wheel. The modular fan assembly can further include an inlet cone mounted to the fan inlet plate at the opening, with the fan wheel mounted concentric with the inlet cone. In embodiments, the fan wheel is spaced from the inlet cone.

In embodiments, the housing further includes side panels and/or a top panel and/or a bottom panel. The frame is spaced from the front panel. In embodiments, the modular fan assembly further includes a divider wall.

The modular fan assembly further includes a plurality of fan assemblies. The plurality of fan assemblies are positioned in an array. The array includes fan assemblies in an array of X by Y, where X and Y are at least 1. In embodiments, X or Y is at least 2.

The array can include divider walls between each of the fan assemblies in the array. At least some of the divider walls can be acoustic divider walls.

These and other features and advantages of the present invention will be apparent from the following detailed description, in conjunction with the appended claims.

DETAILED DESCRIPTION

Figure 1:
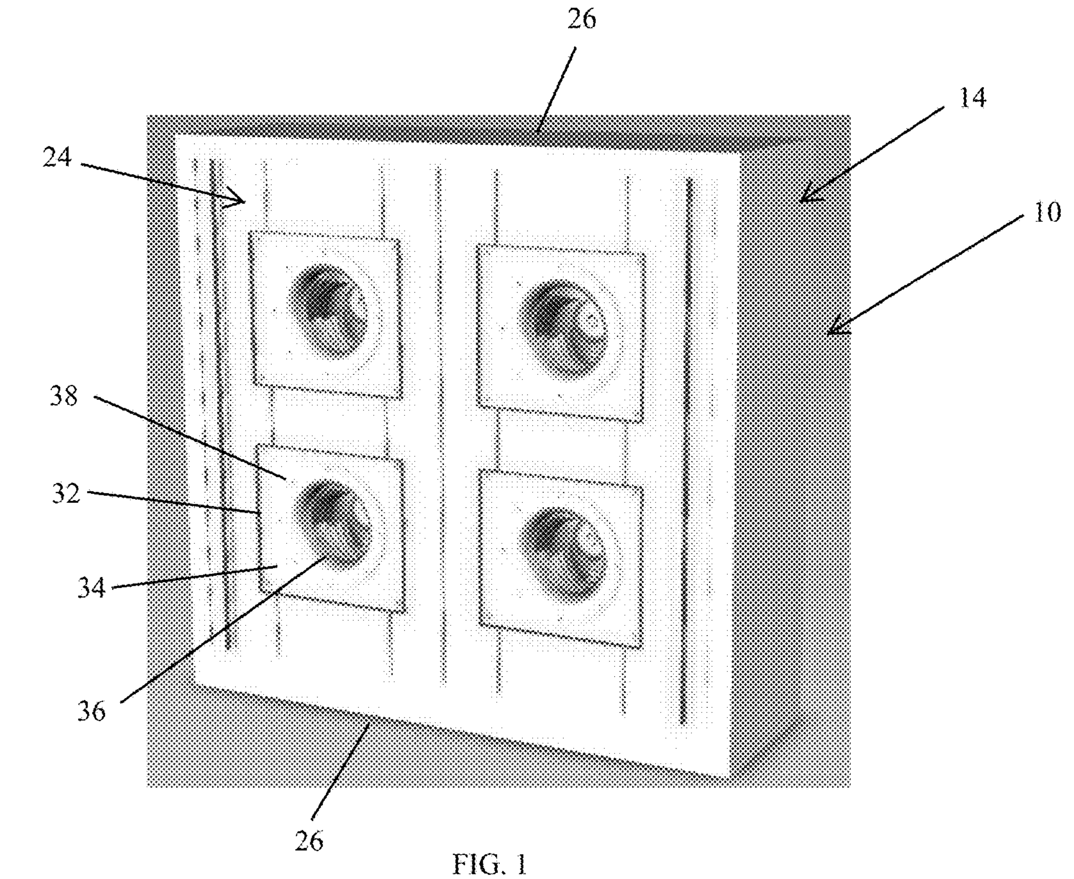
FIG. 1 is a front perspective view of an embodiment of the modular fan array according to the present disclosure, showing a 2 by 2 (2×2) array.
Figure 2:
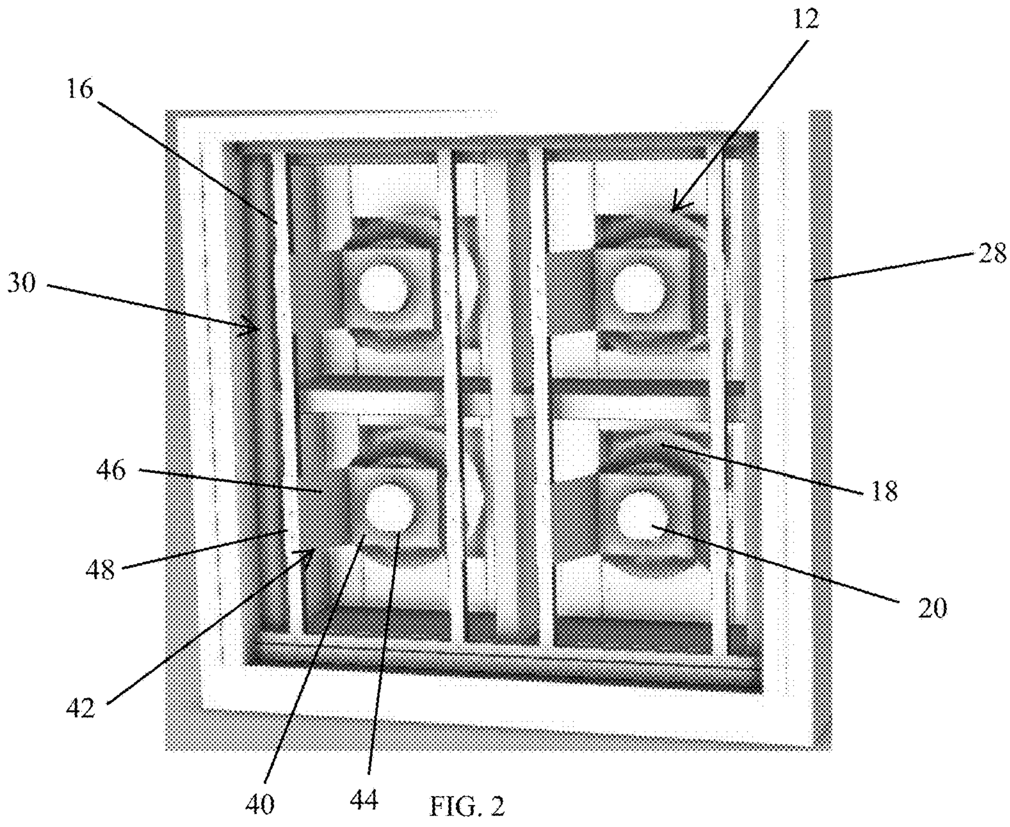
FIG. 2 is a rear perspective view of the fan array of FIG. 1.
Figure 3:
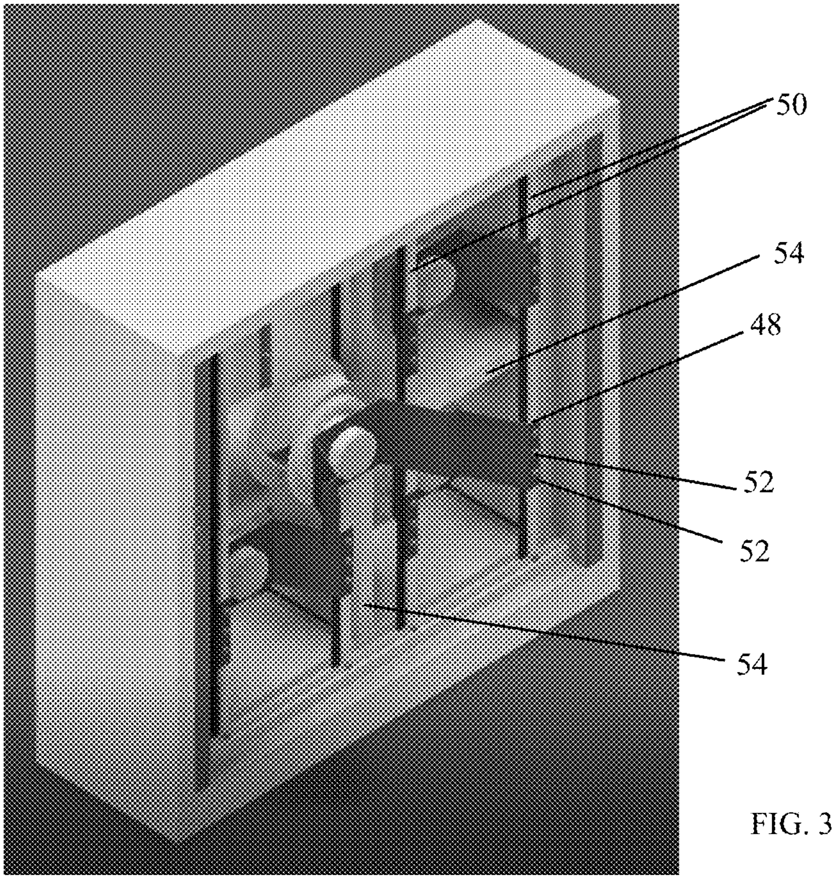
FIG. 3 is another rear perspective view showing one of the fan assemblies partially removed from the array housing.
Figure 4:
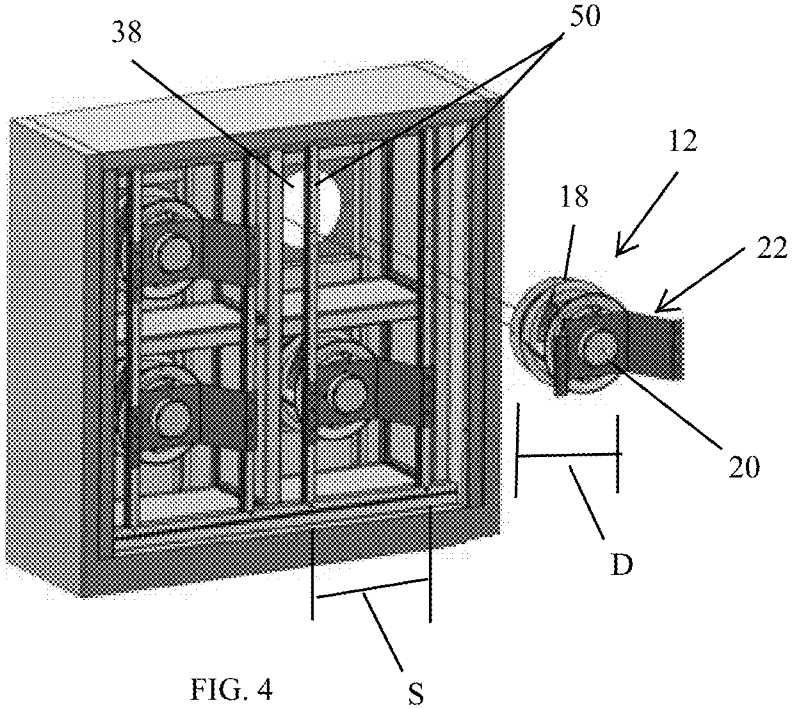
FIG. 4 is a view similar to FIG. 3, illustrating the removal of the fan assembly.

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Air-handling systems include, among other components, one or more fan assemblies in an array to generate the required airflow for the environment of the air-handling system. Fan arrays 10, according to the disclosure, are formed by multiple individual fan assemblies 12.

Referring to the figures, there is shown a two by two (2×2) fan array 10. It will be understood that the size of the array 10 can and will vary based on the air handling requirements (e.g., heating and cooling) for the facility and location, the space, for example, the footprint allowed for the air handling system, and other considerations. It will be appreciated that the modular fan array 10 can include fan assemblies 12 in an array of X by Y, where X and Y are at least 1. In embodiments, X or Y is at least 2.

The fan array 10 may be part of a larger air handling system that includes, for example, heaters, coolers/chillers, and other environmental control equipment.

The fan array 10 includes a housing 14 having a frame 16, and one or more fan assemblies 12. Each fan assembly 12 includes a fan wheel 18, a fan motor 20 and a mounting bracket 22. The housing 14 may include a front panel 24 (inlet side), top and bottom panels 26, and side panels 28. The frame 16 can be fabricated from steel, aluminum or the like. For example, the frame 16 can be fabricated from structural members, such as channel members, such as strut channel members. The frame 16 is mounted in the housing 14 just inside of a rear or outlet side 30 of the housing 14. The front, sides, top and bottom panels 24, 26, 28 are mounted around the frame 16. Typically, the housing 14 includes an open rear or outlet side 30.

The front panel 24 includes openings 32 for the fan assemblies 12. Fan inlet plates 34 are mounted to the front panel 24, and inlet cones 36 are mounted to the fan inlet plates 34. In an embodiment, the fan inlets plates 34 and inlet cones 36 are fabricated for a specific fan wheel 18 size. The inlet plates 34 include an opening 38 and can be mounted to the front panel 24 by fasteners such as screws, bolts and the like. The inlet cones 36 can likewise be mounted to the fan inlet plates 34 by fasteners such as screws, bolts and the like. In embodiments, the fan wheel 18 is mounted concentric with and spaced from the inlet cone 36.

The mounting bracket 22 can be formed as an integral part of the fan assembly 12. That is, the fan wheel 18, fan motor 20 and mounting bracket 22 are a fabricated as a unitary assembly. In an embodiment the mounting bracket 22 is a single piece that includes a motor mount portion 40 and a pair of rearwardly and outwardly extending legs 42. The motor mount portion 40 includes an opening 44 in which the motor 20 is mounted. The rearwardly and outwardly extending legs 42 each have a first angled section 46 (angled relative to the motor mount portion 40) and a second frame mount portion 48. In an embodiment, the frame mount portions 48 extend outwardly from the angled sections 46 and are parallel to the motor mount portion 40.

The frame mount portions 48 are configured to be fastened directly to the frame 16 at the outlet side 30 of the housing 14. The fan assembly 12 and frame 16 are configured such that when the fan assembly 12 is mounted to the frame 16, the fan wheel 18 is spaced from (i.e., not in contact with) the inlet cone 36. In such a configuration, the spacing S between frame upright or vertical members 50 is such that the spacing S is greater than the largest diameter D of the fan wheel 18.

The frame mount portions 48 are secured to the frame 16 by, for example, bolts 52, to secure the fan assembly 12 in place on the frame 16 and in the housing 14. The rearwardly and outwardly extending legs 42, in combination with the spacing S of the upright frame members 50, are configured such that the fan wheel 18 (the largest diameter component of the fan assembly 12), can readily be removed from the housing 14, and fit between the frame members 50. This, along with the readily accessible mounting fasteners 52, provides for readily removing and replacing a fan assembly 12 as needed.

The array 10 can include divider walls 54 between each of the fan assemblies 12 in the modular fan array 10. At least some of the divider walls 54 can be acoustic divider walls.

The present modular fan array 10 provides numerous benefits over know air handling fan systems. For example, the present modular fan array 10 can be fabricated and installed at a reduced weight, which offers benefits such as not affecting existing building structures or updating building structures to meet building codes when the system is a retrofit design. The present modular fan array 10 can also provide for lower costs for installations, a reduced overall unit footprint, reduced assembly time and materials, and ease of fan assembly 12 replacement.

The present modular fan array 10 can be configured with or without the divider walls 54 (between the fan assemblies 12), with acoustic divider walls (as needed) and with a Volume Fan Manager (VFM) which is a diagnostic and monitoring system for the fan assemblies 12 (and air handling system generally), for a variety of applications.

Although a 2×2 array 10 is illustrated, it will be understood that the fan array 10 can be designed in a wide variety of configurations, all of which configurations are within the scope and spirit of the present disclosure. Again, it will be appreciated that the modular fan array 10 can include modular fan assemblies 12 in an array of X by Y, where X and Y are at least 1. In embodiments, X or Y is at least 2.

It will also be appreciated that the fan assembly 12 (the fan wheel 18 and fan motor 20) are provided on a rear removable mounting bracket 22 which is bolted to a vertical frame or rack system 16. Further, the system design is flexible and can be provided without divider walls or with divider walls having two options: an acoustic liner wall (for highly sensitive acoustics applications); or a solid liner wall.

Features from any one of the embodiments described above may be implemented in, combined or used together with, or replace features from any of the other embodiments described above.

It is understood the various features from any of the embodiments above are usable together with the other embodiments described herein.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

The invention claimed is:

1. A modular fan array, comprising:

a plurality of fan assemblies including at least a first fan assembly having a fan wheel, a fan motor, and a mounting bracket;

a frame having at least a pair of vertical members having a spacing therebetween, the spacing being greater than a diameter of the fan wheel, and wherein at least two of the plurality of fan assemblies are mounted to a single pair of vertical members; and a housing in which the frame and the plurality of fan assemblies are mounted, wherein the mounting bracket includes a motor mount portion and a pair of rearwardly and outwardly extending legs, the motor mount portion including an opening in which the motor is mounted, the rearwardly and outwardly extending legs each having an angled section angled relative to the motor mount portion and a frame mount portion, the frame mount portions extending outwardly from the angled portions and parallel to the motor mount portion, and wherein the frame mount portions are removably secured to the frame, and wherein the housing comprises an open rear side via which the plurality of fan assemblies are configured to be inserted and removably secured to the frame.

2. The modular fan array of claim 1, wherein the mounting bracket is formed as an integral part of the first fan assembly.

3. The modular fan array of claim 1, wherein the mounting bracket is secured to the frame by bolts.

4. The modular fan array of claim 1, wherein the housing includes a front panel.

5. The modular fan array of claim 4, further including a fan inlet plate mounted to the front panel, the fan inlet plate associated with and defining an opening for the fan wheel.

6. The modular fan array of claim 5, further including an inlet cone mounted to the fan inlet plate at the opening, wherein the fan wheel is mounted concentric with the inlet cone.

7. The modular fan array of claim 6, wherein the fan wheel is spaced from the inlet cone.

8. The modular fan array of claim 4, wherein the frame is spaced from the front panel.

9. The modular fan array of claim 1, wherein the housing further includes side panels and/or a top panel and/or a bottom panel.

10. The modular fan array of claim 1, further including a divider wall.

11. The modular fan array of claim 1, wherein the plurality of fan assemblies are positioned in an array, wherein the array includes X by Y fan assemblies, wherein X and Y are each at least 2.

12. The modular fan array of claim 1, further including divider walls between each of the fan assemblies in the array.

13. The modular fan array of claim 12, wherein at least some of the divider walls are acoustic divider walls.

* * * * *